United States Patent
Durham et al.

(10) Patent No.: US 6,475,390 B1
(45) Date of Patent: Nov. 5, 2002

(54) PROCESS FOR THE PURIFICATION OF NUTRIENTS FROM FOOD PROCESS STREAMS

(75) Inventors: Rosalie Joyce Durham, Emu Heights (AU); James Arthur Hourigan, Castle Hill (AU); Robert Walter Sleigh, Rose Bay (AU); Robert Leonard Johnson, Castle Hill (AU)

(73) Assignees: University of Western Sydney, Hawkesbury-Richmond (AU); Commonwealth Scientific and Industrial Research Organization, Campbell (AU); Dairy Research and Development Corporation, Melbourne (AU)

( * ) Notice: Subject to any disclaimer, the term of this patent is extended or adjusted under 35 U.S.C. 154(b) by 0 days.

(21) Appl. No.: 09/463,508
(22) PCT Filed: Jul. 24, 1998
(86) PCT No.: PCT/AU98/00588
§ 371 (c)(1), (2), (4) Date: Apr. 14, 2000
(87) PCT Pub. No.: WO99/04903
PCT Pub. Date: Feb. 4, 1999

(30) Foreign Application Priority Data

Jul. 24, 1997 (AU) .............................................. PO8213

(51) Int. Cl.[7] .............................................. B01D 61/58
(52) U.S. Cl. ........................ 210/650; 127/46.2; 127/54; 210/651; 210/656; 210/662; 210/663; 210/669; 210/677
(58) Field of Search ................................ 210/677, 638, 210/650, 651, 662, 669, 663, 687, 656, 610; 127/46.2, 46.3, 54, 55, 56; 426/490, 491

(56) References Cited

U.S. PATENT DOCUMENTS

| | | | | |
|---|---|---|---|---|
| 2,937,959 A | * | 5/1960 | Reents et al. | |
| 3,883,714 A | * | 5/1975 | Schneider et al. | |
| 4,046,590 A | * | 9/1977 | Riffer | 127/56 |
| 4,101,338 A | * | 7/1978 | Rapaport et al. | 127/54 |
| 5,254,174 A | * | 10/1993 | Hansen et al. | |
| 5,443,650 A | * | 8/1995 | Saska et al. | |
| 5,454,952 A | * | 10/1995 | Brewer | 210/651 |
| 5,641,406 A | * | 6/1997 | Sarhaddar et al. | 210/656 |
| 5,851,372 A | * | 12/1998 | Noel | |

FOREIGN PATENT DOCUMENTS

| | | |
|---|---|---|
| AU | A-64676/94 | 12/1994 |
| WO | WO 95/26808 | 10/1995 |
| WO | WO 95/30482 | 11/1995 |
| WO | WO 97/04134 | 2/1997 |

OTHER PUBLICATIONS

Scott et al. Handbook of Industrial Membranes, 1st edition. Elsevier Science Publishers, 1995. pp. 736–742.*

* cited by examiner

Primary Examiner—Joseph W. Drodge
(74) Attorney, Agent, or Firm—Fish & Richardson P.C.

(57) ABSTRACT

A separation process is described for separation of a nutrient from divalent ions of an aqueous solution. The aqueous solution is contacted with an ion exchange resin that includes monovalent ions until the concentration of divalent ions in the aqueous solution has been depleted and an eluate is collected. The eluate is then subjected to a process, preferably a nanofiltration membrane process, capable of separating monovalent ions to obtain a permeate fraction including monovalent ions and a retentate fraction including the nutrient. The retentate fraction is then separated into fractions with at least one fraction including a major portion of the nutrient. The ion exchange resin is then regenerated by contacting it with a solution including the permeate fraction until a major portion of the divalent ions have been replaced by monovalent ions.

25 Claims, 4 Drawing Sheets

PROCESS FOR THE PURIFICATION OF NUTRIENTS FROM FOOD PROCESS STREAMS

This application is a 371 of PCT/AU98/00588.

TECHNICAL FIELD

The present invention relates to a process for purifying biological molecules from food process streams and to the biological molecules prepared by the process.

BACKGROUND ART

The food processing industry, particularly, the dairy and the sugar refining industries, generates substantial quantities of aqueous by-product solutions and extracts (process streams), which can present a serious waste disposal problem but which also represent a rich source of nutrients such as sugars, proteins, peptides, minerals, vitamins, etc. By extracting the valuable nutrients from the aqueous process streams before disposal, the environmental impact of such wastes can be minimised.

Methods for extraction of sugars from aqueous food processing streams or extracts, based on chromatographic separation procedures, have been described for sucrose molasses, whole whey, milk, and lactose molasses etc. The methods that make use of chromatographic procedures, particularly ion exclusion chromatography, have the disadvantage of not being able to resolve clearly the peaks of ionic materials from non-ionic materials in the presence of divalent cations. The process comprises, at least in part, subjecting the process stream to an ion exclusion chromatography step using a chromatography column comprising a strong cation resin in the monovalent metal form. As the magnesium and/or calcium ions contained in the process stream exchange with the monovalent metal ions on the cation resin, the separating capability of the cation resin is progressively reduced. This necessitates periodic interruption of the purification procedure to regenerate the cation exchange resin which in turn involves consumption of regeneration reagents thus resulting in the generation of further waste material requiring disposal and the reduction in the productivity of the process.

A process developed for the processing of sugar factory molasses includes an ion exchange pre-column charged with sodium and/or potassium ions which is designed to remove calcium and/or magnesium salts from the molasses before it is subjected to further chromatographic separation to purify the desired sugar. In this process, the pre-column which after a time becomes saturated with calcium and magnesium ions, thus losing its effectiveness, is "recharged" or regenerated with monovalent metal ions by recycling through the pre-columns the monovalent ion fraction obtained from the chromatography column.

However, the purification procedures which may be applicable to a particular process stream may not be easily adapted for use with process streams which have origins in a different industry. Thus, a method developed for purification of sugars from, for example, sugar factory molasses cannot be applied to purification of sugars from, for example, dairy process streams because of the differences in the nature and content of other organic and inorganic molecules present in the process streams. For example, it has been found that the monovalent ion fraction obtained from chromatographic separation of process streams with a high content of phosphate, which when this fraction is used to regenerate the pre-column, interacts with calcium in the pre-column and precipitates, thus blocking the column and reducing its efficiency.

There is, therefore, a need for a chromatographic process for isolation of valuable nutrients and minerals which is applicable to food processing streams generally, and which does not have the above mentioned disadvantages.

Thus, it is the object of the present invention to overcome or at least ameliorate some of the disadvantages of the prior art discussed above, or to provide a useful alternative.

SUMMARY OF THE INVENTION

According to a first aspect there is provided a separation process including the steps of:

a) contacting an aqueous solution including a nutrient and divalent ions with an ion exchange resin including monovalent ions, until the concentration of divalent ions in said aqueous solution has been depleted in comparison to the initial concentration of divalent ions in said aqueous solution and collecting the eluate;

b) subjecting the eluate from step (a) to a process capable of separating monovalent ions to obtain a permeate fraction including monovalent ions and a retentate fraction including said nutrient;

c) separating the retentate fraction from step (b) into fractions, wherein at least one of said fractions includes the major portion of said nutrient, d) regenerating the ion-exchange resin in step (a) by contacting the ion-exchange resin with a solution including the permeate fraction from step (b) until a major portion of divalent ions in the ion exchange resin have been replaced by monovalent ions.

The divalent ions may be primarily calcium and/or magnesium, and the monovalent ions may be primarily sodium and/or potassium.

For preference, the process for separating monovalent ions is a membrane process and more preferably it is nanofiltration. However other processes which would be equally effective would be clear to a skilled addressee from the teaching herein.

It will be understood that more than one fraction in step (c) of the process could contain nutrients of interest which may be isolated and purified by the process. Also, one of the fractions in step (c) is preferably ionic and may contain ionic nutrients such as minerals whereas the other is preferably non-ionic and may contain non-ionic nutrients such as sugars.

It will be understood that in other embodiments of the invention nanofiltration of the aqueous solution may be conducted before step (a) and the nanofiltration permeate may be used subsequently to regenerate the ion-exchange resin used in step (a).

Preferably the separation step (c) is performed on an ion exclusion resin.

Optionally a number of additional separation and purification steps may be used in the process, as outlined for example in FIGS. 1 to 4.

According to a second aspect there is provided a nutrient prepared by the process according to the first aspect.

The nutrients which may be extracted by the process to a very high level of purity are carbohydrates (including sugars), vitamins, peptides, proteins, minerals and the like.

Preferred feed streams which can be used in the process of the present invention are dairy process streams containing lactose and minerals such as sweet cheese whey permeate, acid whey permeate, milk permeate, and mother liquor from lactose crystallisation process.

Other feed streams containing sugar and minerals which can also be used are raw beet and cane juice extracts, beet and cane molasses, hydrolysed starch and the like. Also, miscellaneous extracts of plants including fruit and vegetable juices, extracts of animal products or extracts of microbial origin including fermentation products may be used with the process of the present invention.

Minor variations and adaptations of the process which may be required for purification of a desired nutrient from different food processing streams would be clear to a skilled addressee from the teaching provided in the present specification.

Unless the context requires otherwise, throughout the specification, and the claims which follow, the words "comprise", and the like, are to be construed in an inclusive sense, that is as "including, but not limited to".

BRIEF DESCRIPTION OF THE FIGURES

Various embodiments of the invention will now be more particularly described by way of example only with reference to the accompanying Figures wherein.

DETAILED DESCRIPTION OF THE PREFERRED EMBODIMENTS

A preferred embodiment of the invention using ion chromatography technology to separate the components of aqueous food processing streams or extracts will now be described. This process employs membranes, ion exchange and ion exclusion to fractionate aqueous food extracts into sugars, minerals and other trace nutrients such as vitamins and peptides. The sugar obtained by the process can be crystallised into high grade sugar, or undergo father processing such as chemical enzymic and physical modifications, to produce for example, hydrolysed lactose syrup, lactulose, lactitol, lactobionic acid, oligosaccharides or other lactose derivatives, while the mineral, peptide and vitamin components can be utilised as nutritional and functional food ingredients.

The present invention improves the efficiency of the ion exclusion separation and thus improves the yield of the desired nutrient, for example, highly pure sugar.

In this embodiment, ion exclusion resin is used in the monovalent form eg. $K^+$ and/or $Na^+$, as derived from the nanofiltration permeate. This ensures a much better separation than can be obtained if the resin is balanced with mineral mixtures containing divalent cations eg. $Ca^{2+}$ and $Mg^{2+}$.

A pre-column packed with an ion exchange resin is used to adsorb the divalent cations from the aqueous food processing stream prior to application to the ion exclusion column. The pre-column is then regenerated with a solution comprising the monovalent ions collected from the permeate from the nanofilter.

FIGS. 1 to 4 are variations of the purification scheme for whey which, in certain embodiments employ an optional precipitation pretreatment. The sequence of the pretreatment steps; precipitation, ion exchange and nanofiltration, can be rearranged depending on the composition of the feed to the ion chromatography process, as shown in the examples.

EXAMPLES

Example 1

Figure 1:
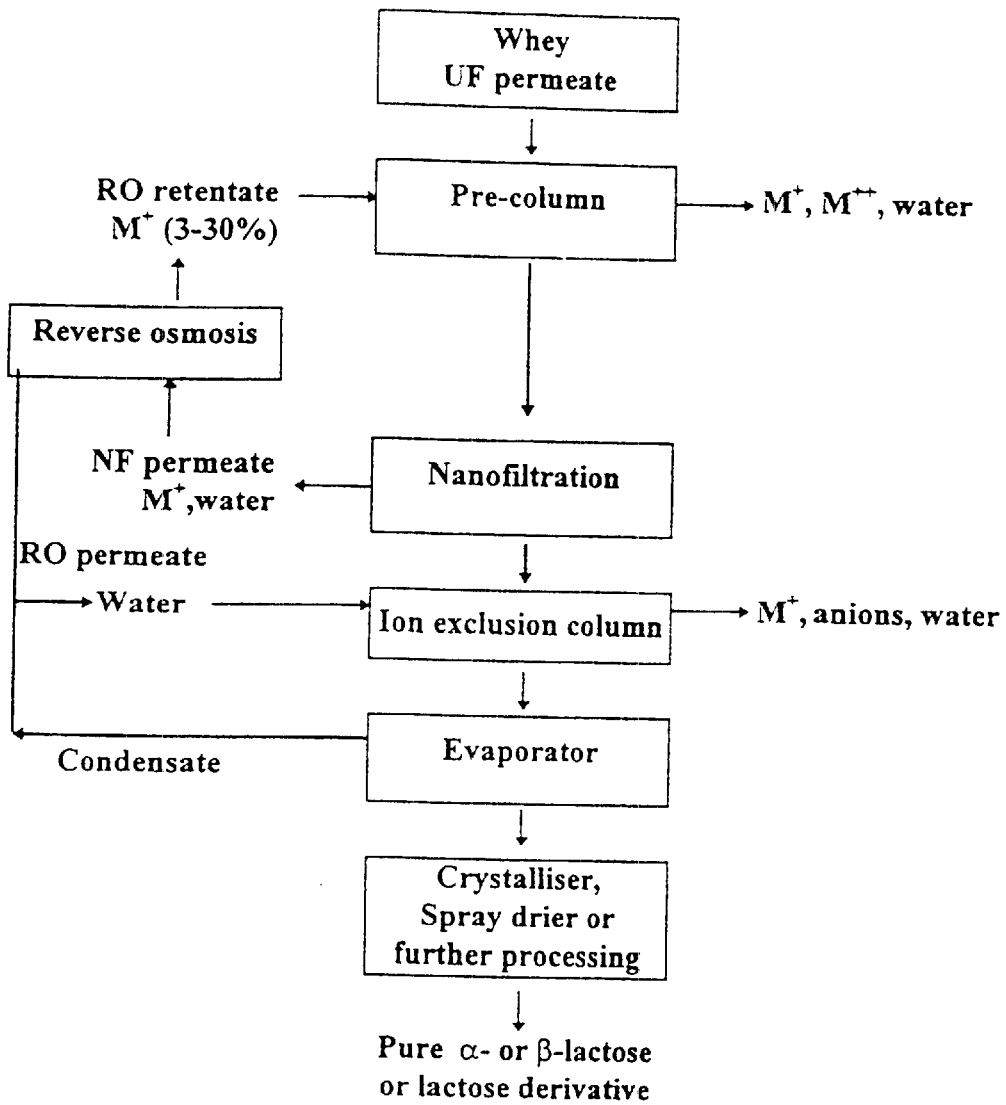
FIG. 1 is a purification scheme for whey which employs ion exchange, nanofiltration then the ion chromatography step.

Purification Scheme for Cheese Whey Permeate
Pretreatment of Ultrafiltered Cheese Whey Permeate Referring to FIG. 1, the ultrafiltered cheese whey permeate is fed onto a pre-column packed with a cation exchange resin, balanced with monovalent cations, to adsorb the divalent cations from whey permeate. The product from this treatment is then processed by nanofiltration to a concentration between 5 and 30° Brix, but preferably in the range 15 to 25° Brix. The nanofilter permeate containing monovalent ions is collected for reuse at a different stage in the process. This option shall be known as pretreatment 1.

Figure 2:
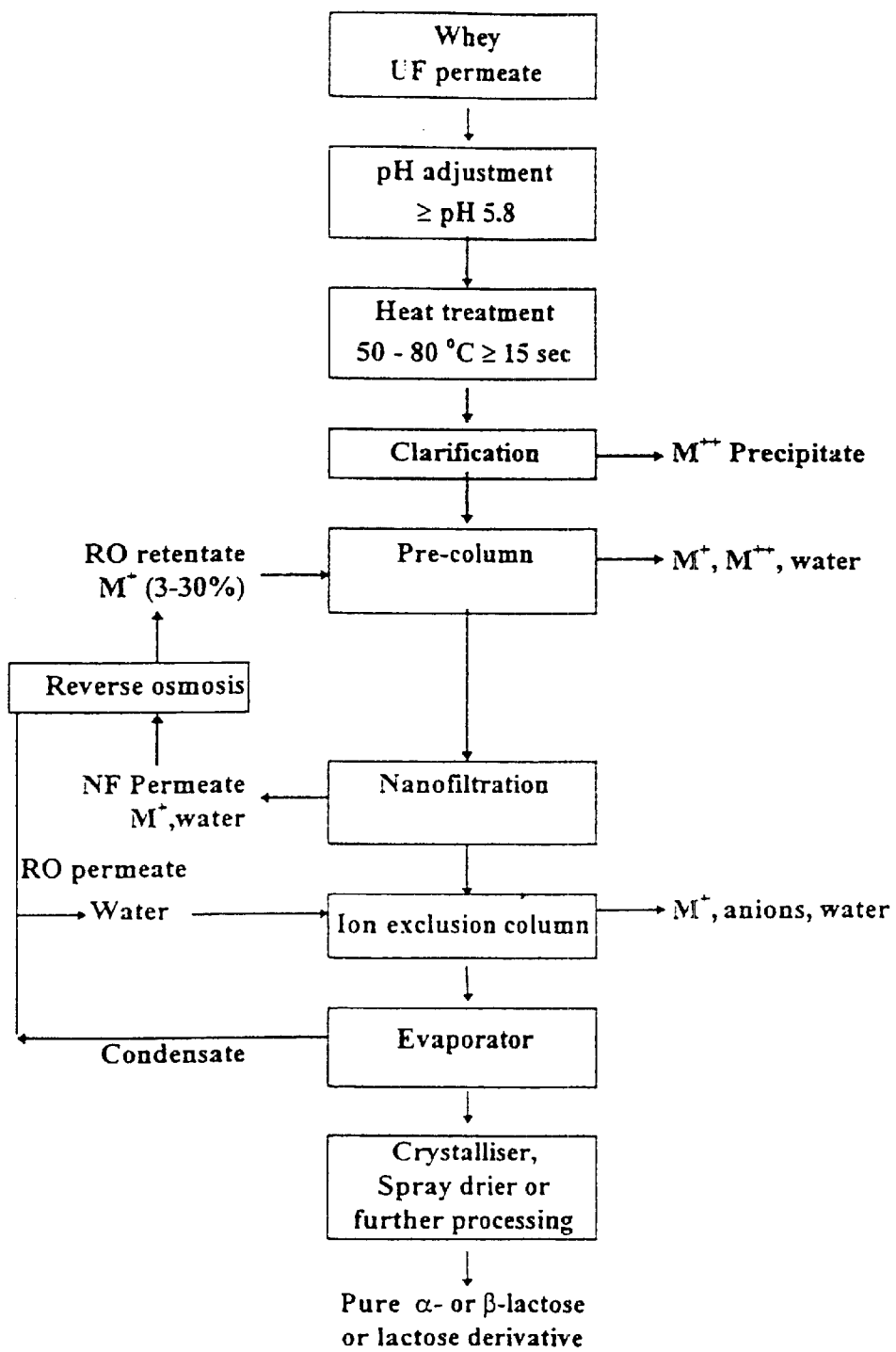
FIG. 2 is a purification scheme which employs precipitation, ion exchange then nanofiltration prior to the ion chromatography step.

Depending on the composition of the whey permeate it may be necessary to conduct a precipitation step as shown on FIG. 2. The ultrafiltered cheese whey permeate is adjusted to a pH 5.8 or greater using an alkali or alkali salt of a monovalent metal such as potassium hydroxide, sodium hydroxide, potassium carbonate or sodium carbonate etc, then heated to 50–80° C. with a holding period (equal or more than 15 seconds) to encourage a precipitate to form. The whey permeate 'suspension' is clarified to remove the precipitate, which contains inter alia calcium and phosphate. The clarified whey permeate is then fed onto a pre-column packed with a cation exchange resin, balanced with monovalent cations, to adsorb the divalent cations from whey permeate. The product from this treatment is then processed by nanofiltration to a concentration between 5 and 30° Brix, but preferably in the range 15 to 25° Brix. The nanofilter permeate containing monovalent ions is collected for reuse at a different stage in the process. This option shall be known as pretreatment 2.

The sequence of the pretreatment steps; precipitation, nanofiltration and ion exchange, can be re-arranged to produce similar results, and can be selected to suit the composition of the whey permeate feed. The precipitation step can be performed on, for example; the whey permeate (see FIG. 2), the retentate of the nanofiltered whey permeate prior to ion exchange (see FIG. 3), or the retentate of ion exchanged nanofiltered whey permeate (see FIG. 4).

Figure 3:
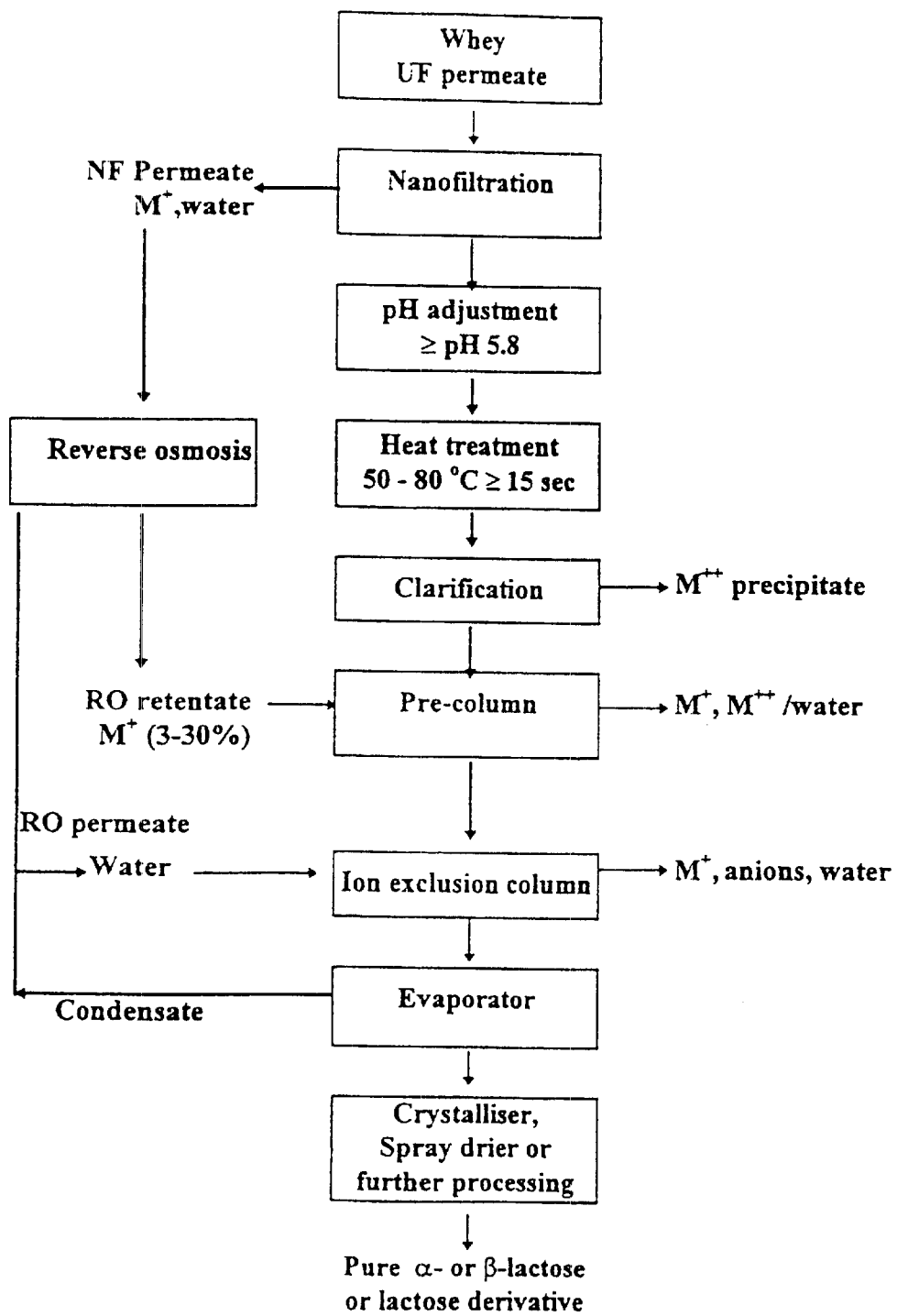
FIG. 3 is a purification scheme which employs nanofiltration, precipitation, then ion exchange prior to the ion chromatography step.

Referring to FIG. 3, the whey permeate is processed by nanofiltration to a concentration between 5 and 30° Brix, but preferably in the range 15 to 25° Brix. The nanofilter permeate containing monovalent ions is collected for re-use at a different stage in the process. The retentate of the nanofiltered whey permeate (5–30° Brix) is adjusted to a pH 5.8 or greater using an alkali or alkali salt of a monovalent metal such as potassium hydroxide, sodium hydroxide, potassium carbonate or sodium carbonate etc., and then heated to 50–80° C. with a holding period (equal or more than 15 seconds) to encourage a precipitate to form. The whey permeate 'suspension' is clarified to remove precipitate, which contains inter alia calcium and phosphate. The resultant clarified retentate of the nanofiltered whey permeate is then fed onto a pre-column packed with a suitable cation exchange resin, balanced with monovalent cations, to adsorb the remaining divalent cations from the retentate. Hereafter this option shall be known as Pretreatment 3.

Figure 4:
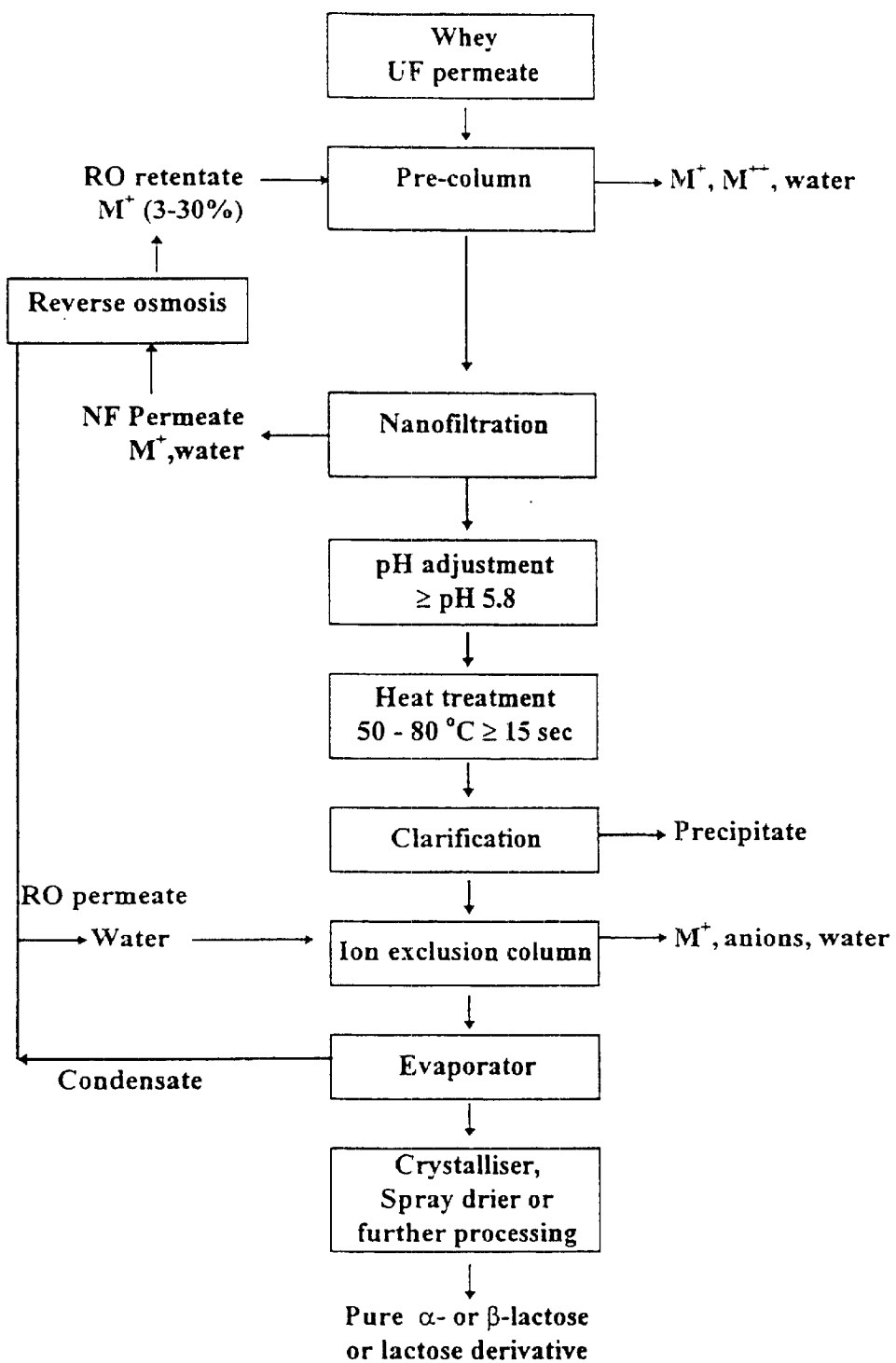
FIG. 4 is a purification scheme which employs ion exchange, nanofiltration then precipitation prior to the ion chromatography step.

Referring to FIG. 4, the ultrafiltered cheese whey permeate is fed onto a pre-column packed with a cation exchange resin, balanced with monovalent cations, to adsorb the divalent cations from whey permeate. The product from this treatment is then processed by nanofiltration to a concentration between 5 and 30° Brix, but preferably in the range 15 to 25° Brix. The nanofilter permeate containing monovalent ions is collected for reuse at a different stage in the process. The retentate from the nanofiltered whey permeate (5–30° Brix) is adjusted to a pH 5.8 or greater using an alkali or alkali salt of a monovalent metal such as potassium hydroxide, sodium hydroxide, potassium carbonate or sodium carbonate etc., and then heated to 50–80° C. with a holding period (equal or more than 15 seconds) to encourage a precipitate to form. The whey permeate 'suspension' is clarified to remove precipitate, which contains inter alia phosphate. Hereafter this option shall be known as pretreatment 4.

Regeneration of the Ion Exchange Resin and Purification of Lactose

The nanofiltration permeate containing monovalent ions collected from either pretreatment is concentrated to 3–30° Brix. This monovalent brine is used to regenerate the ion exchange pre-column by desorbing the divalent ions that had collected on the resin from ion exchange of the whey permeate (1), (2), (3) or (4). The spent regeneration brine can be recycled, augmented and recycled, or collected for use as a food ingredient, depending upon the requirements of the process. The recycling of brine may be conducted by a number of processes, which are well known in the art and which are described in, for example, "Ion Exchangers" (ed. Konrad Dorfner, Walter de Gruyter, New York, 1991).

Ion Exclusion Purification of Pretreated Whey

The pre-treated whey permeate from (1), (2), (3) or (4) containing lactose, monovalent cations, anions, peptides and vitamins at 5–30° Brix can be further concentrated by evaporation to any solids level up to 60° Brix.

The pre-treated whey permeate at 5–60° Brix is fed onto column/s loaded with a cation exchange resin suitable for ion exclusion. The resin has been equilibrated with a mixture of the monovalent ions normally found in the nanofiltration permeate of whey. The injected aliquots of concentrated pre-treated whey permeate are eluted through the column/s with water to separate the ionic (minerals and peptides) from the non-ionic (lactose) components.

The process water for the ion exclusion process may be obtained from the RO permeate or evaporator condensate.

If there is an intermediate fraction containing a mixture of ionic and non-ionic components, it is returned to the pre-treated whey permeate for concentration and recycling through the ion exclusion process.

Purified Whey Components

The ionic components are collected from the first eluting peak. The ionic components comprise soluble salts of potassium and sodium, phosphates, citrates and lactates, and small ionic peptides. This mixture would be suitable for use as a natural salt alternative, with applications in meat and dairy products and nutritional formulations.

The purified lactose is collected from the second eluting peak. Purified lactose can be concentrated, crystallised or spray dried to produce alpha and/or beta lactose. Alternatively, the purified lactose solution can undergo further processing such as chemical, enzymic and physical modifications, to produce for example, hydrolysed lactose syrup, lactulose, lactitol, lactobionic acid, oligosaccharides or other lactose derivatives.

The production of a pure lactose solution from whey by the present process enables:

Pharmaceutical grade lactose (less than 0.1% ash) from a single crystallisation.

More control over crystallisation processes, hence control over crystal size distribution and bulk density flow characteristics.

Purified lactose from the ion exclusion column can be pre-crystallised and spray dried to produce dispersable and tabletting lactose.

Purified lactose solutions can be hydrolysed to produce pure, sweetening syrups.

Purified lactose solutions can be converted into lactose derivatives such as lactulose, lactitol, lactobionic acid or oligosaccharides.

Example 2

Process Variation

The pre-column can also be integrated into the ion exclusion process when the pretreatment 3 option is employed. The first column of the series can be used to adsorb the divalent ions, then the feed directly passes onto the series of ion-exclusion columns to separate the minerals and lactose.

The divalent ions on the first column of the series are desorbed with the concentrated minerals from the nanofilter, and whilst the first column is being desorbed/regenerated, the next column in the series is used as the first column for divalent adsorption/ion exclusion. In this way, each of the columns will be regenerated in turn, maintaining a good separation over extended runs.

Process Feeds

Typical feed streams which can be used in the process of the present invention are dairy process streams containing lactose and minerals such as sweet cheese whey permeate, acid whey permeate, milk permeate, and mother liquor from lactose crystallisation process.

Other feed streams containing sugar and minerals include: raw beet and cane juice, beet and cane molasses, hydrolysed starch.

Miscellaneous extracts of plants including fruit and vegetable juices, extracts of animal products or extracts of microbial origin including fermentation products.

Advantages of the Present Invention

An advantage of the present process when applied, for example, to purification of sugar such as lactose from dairy streams, is that it minimises production of mother liquor, the major waste by-product of lactose manufacture. The process employs pretreatment process/es that enable ion exclusion purification of the total whey permeate from cheese production, not just the mother liquor left after lactose crystallisation.

Another advantage of the present process is that it is self contained. For example, regeneration of resin uses the minerals separated by the nanofilter, and minimises the need to purchase salt or dispose extra salt to the environment The process water for the ion exclusion column is obtained from recycling reverse osmosis permeate or evaporator condensate from the whey concentration steps. The recycling of minerals and water within the process, minimises costs and the impact of the process on the environment.

Applications for each of the by-product streams such as purified lactose, spent regeneration brine and mineral-peptide-mixtures, can be developed. Utilisation of the by-product streams enhances the economic return on investment and minimises the impact of the process on the environment For example, in the case of lactose purification, the purified lactose can be crystallised or spray dried into dispersable and tabletting lactose or further processed into lactose derivatives such as lactulose or hydrolysed lactose syrup. The fractionated mineral isolates from the spent regeneration brine and mineral-peptide-vitamin mixtures from the mineral cut of the ion exclusion column, can be utilised as nutritional and functional food ingredients.

Although the invention has been described with reference to specific embodiments, modifications that are within the knowledge of those skilled in the art are also contemplated as being within the scope of present invention.

What is claimed is:

1. A separation process comprising the following steps
    (a) contacting an aqueous solution comprising a nutrient and divalent ions with an ion exchange resin comprising monovalent ions, until the concentration of divalent ions in said aqueous solution has been depleted in comparison to the initial concentration of divalent ions in said aqueous solution and collecting the eluate;
    (b) subjecting the eluate from step (a) to a process capable of separating monovalent ions to obtain a permeate fraction comprising monovalent ions and a retentate fraction comprising said nutrient;
    (c) separating the retentate fraction from step (b) into fractions, wherein at least one of said fractions comprises the major portion of said nutrient;
    (d) regenerating the ion-exchange resin in step (a) by contacting the ion-exchange resin with a solution comprising the permeate fraction from step (b) until a major portion of divalent ions in the ion exchange resin have been replaced by monovalent ions.

2. The separation process of claim 1, wherein the divalent ions are selected from the group consisting of calcium, magnesium and calcium and magnesium.

3. The separation process of claim 1, wherein the process in step (b) comprises a membrane process.

4. The separation process of claim 3, wherein the membrane process is nanofiltration.

5. The separation process of claim 4, wherein a solution comprising the permeate is used to regenerate the ion exchange resin of step (a).

6. The separation process of claim 1, wherein more than one of the fractions in step (c) of the process comprises a nutrient.

7. The separation process of claim 1, wherein at least one of the fractions in step (c) is ionic and at least another fraction is non-ionic.

8. The separation process of claim 1, wherein an ionic fraction comprises an ionic nutrient and a non-ionic fraction comprises a non-ionic nutrient.

9. The separation process according to claim 1, wherein the aqueous solution is subjected to the process of separating monovalent ions to obtain a permeate fraction comprising monovalent ions and a retentate fraction comprising nutrients according to step (b) before step (a), wherein the retentate fraction is contacted with the ion exchange resin comprising monovalent ions.

10. The separation process according to claim 9, wherein a solution comprising the permeate fraction is obtained from a membrane process which is used to regenerate the ion exchange resin of step (a).

11. The separation process according to claim 9, wherein the permeate ionic fraction comprises ionic nutrients and the retentate fraction comprises non-ionic nutrients.

12. The separation process of claim 1, wherein the aqueous solution comprising a nutrient and divalent ions is selected from the group consisting of a dairy process stream, a cheese whey permeate, an acid whey permeate, a milk permeate and a mother liquor from a lactose crystallization process.

13. The process according to claim 12, wherein the process stream contains lactose and minerals.

14. The separation process of claim 1, wherein the aqueous solution comprising a nutrient and divalent ions is selected from the group consisting of a raw beet extract, a cane juice extract, a beet molasses, a cane molasses, a hydrolyzed starch, a fruit juice, a vegetable juice, an extract of an animal product, an extract of microbial origin and an extract of a fermentation process.

15. The process according to claim 12, wherein step (c) is performed on an ion exclusion resin.

16. The process according to claim 1, wherein the nutrient is selected from the group consisting of carbohydrates, vitamins, peptides, proteins and minerals.

17. The process according to claim 1, wherein the nutrient is a mineral.

18. The process according to claim 1, wherein the nutrient is a carbohydrate.

19. The process according to claim 18, wherein the carbohydrate is a sugar.

20. The process according to claim 19, wherein the sugar is lactose.

21. A nutrient prepared by the process according to claim 1.

22. The nutrient according to claim 21, selected from the group consisting of carbohydrates, vitamins, peptides, proteins and minerals.

23. The nutrient according to claim 21, wherein the nutrient is a carbohydrate.

24. The nutrient according to claim 23, wherein the carbohydrate is lactose.

25. The nutrient according to claim 21, in substantially pure form.

* * * * *